United States Patent [19]
Lilley

[11] Patent Number: 5,105,509
[45] Date of Patent: Apr. 21, 1992

[54] HOSE CLAMP

[76] Inventor: Albert Lilley, Lot 18 Antoine Cres. Mt. St. Louis Estates, R.R. #1, Hillsdale, Ont. L0L 1V0, Canada

[21] Appl. No.: 708,364

[22] Filed: May 31, 1991

[51] Int. Cl.$^5$ ............................................. B65D 63/00
[52] U.S. Cl. ................................ 24/20 R; 24/20 CW; 24/20 EE
[58] Field of Search ............... 24/20 R, 20 CW, 20 W, 24/20 EE, 23 W, 23 EE

[56] References Cited

U.S. PATENT DOCUMENTS

| | | | |
|---|---|---|---|
| 1,294,951 | 2/1919 | Rohrbacher | 24/20 EE |
| 1,912,180 | 5/1933 | Cornell | 24/20 EE |
| 2,113,443 | 4/1938 | Eggerss | 24/20 EE |
| 3,321,811 | 5/1967 | Thomas | 24/20 CW |
| 3,789,463 | 2/1974 | Oetiker | 24/20 CW |
| 4,299,012 | 11/1981 | Oetiker | 24/20 W |
| 4,802,261 | 2/1989 | Mizukoshi et al. | 24/20 R |
| 4,998,326 | 3/1991 | Oetiker | 24/20 R |

*Primary Examiner*—Victor N. Sakran
*Attorney, Agent, or Firm*—Cushman, Darby & Cushman

[57] ABSTRACT

A hose clamp is disclosed comprising a clamping band having open ends for lapping one end over the other end in a lapping direction and presenting a lapped portion and a lapping portion. The open ends of the band are mechanically interconnected by several outwardly extending hooks in the lapped portion. The hooks are operable to engage in corresponding apertures in the lapping portion. The clamp structure has an ear for tightening the clamping band about an object to be fastened, characterized in that at least one hook extends out of the plane in the lapping direction presenting a hook aperture and at least one corresponding aperture has a tab extending from an edge of the aperture in a direction opposite the lapping direction for abutting the hook, whereupon deformation of the ear the tab deforms towards the lapped portion forming an abutment surface for absorbing the circumferentially directed clamping forces and projects into the hook aperture for interlocking the lapped portion with the lapping portion.

11 Claims, 3 Drawing Sheets

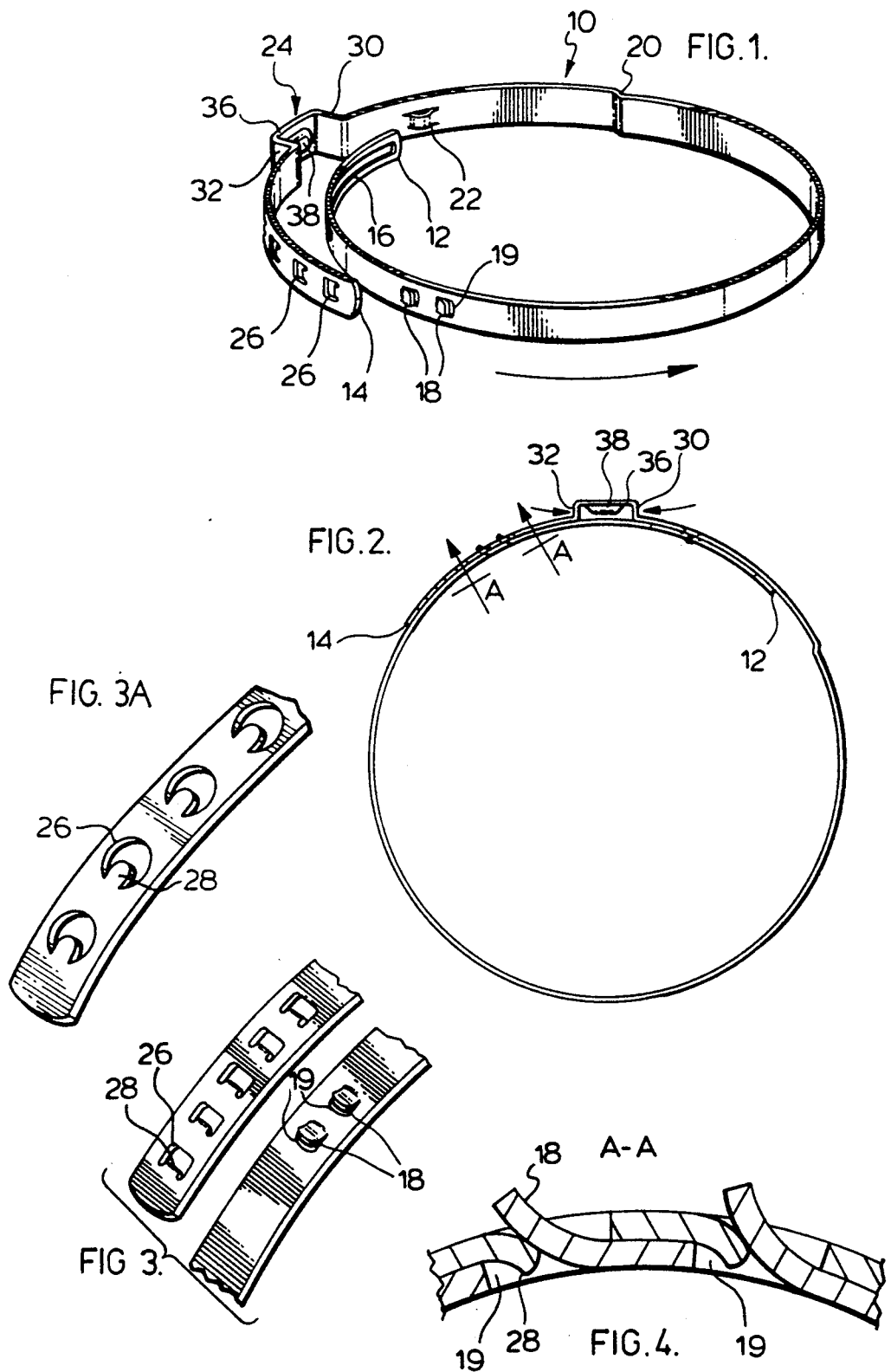

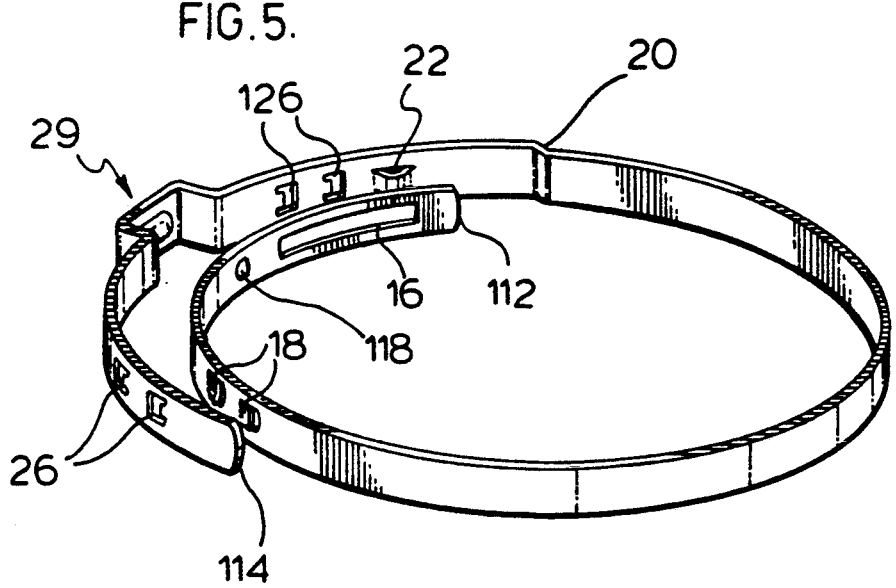

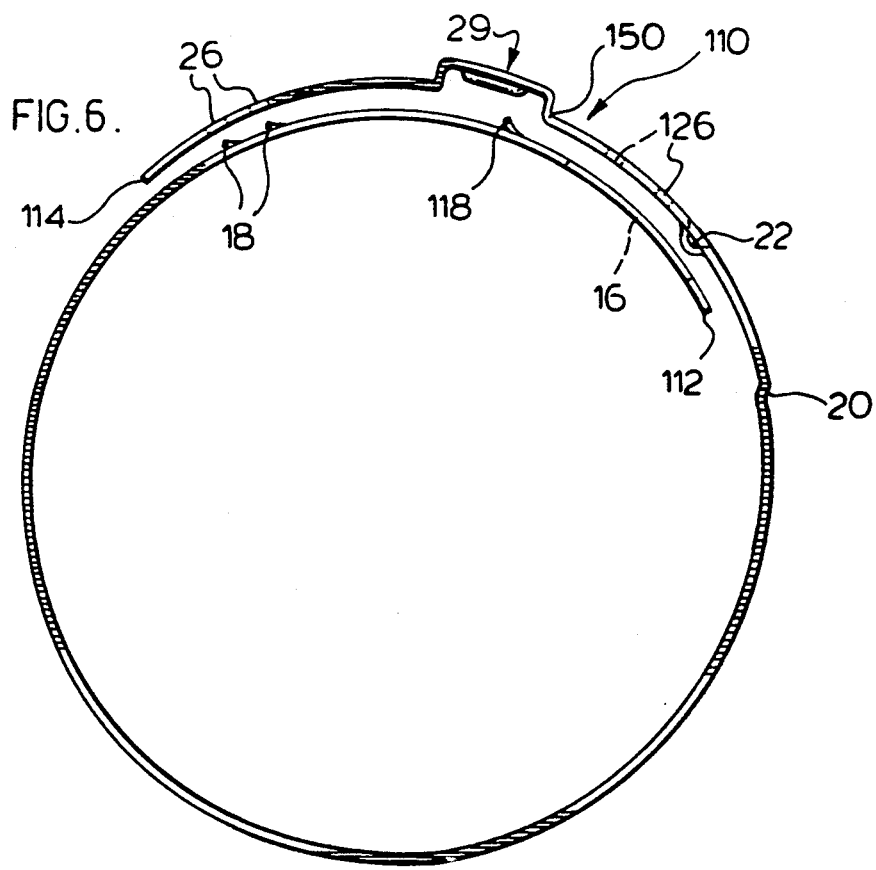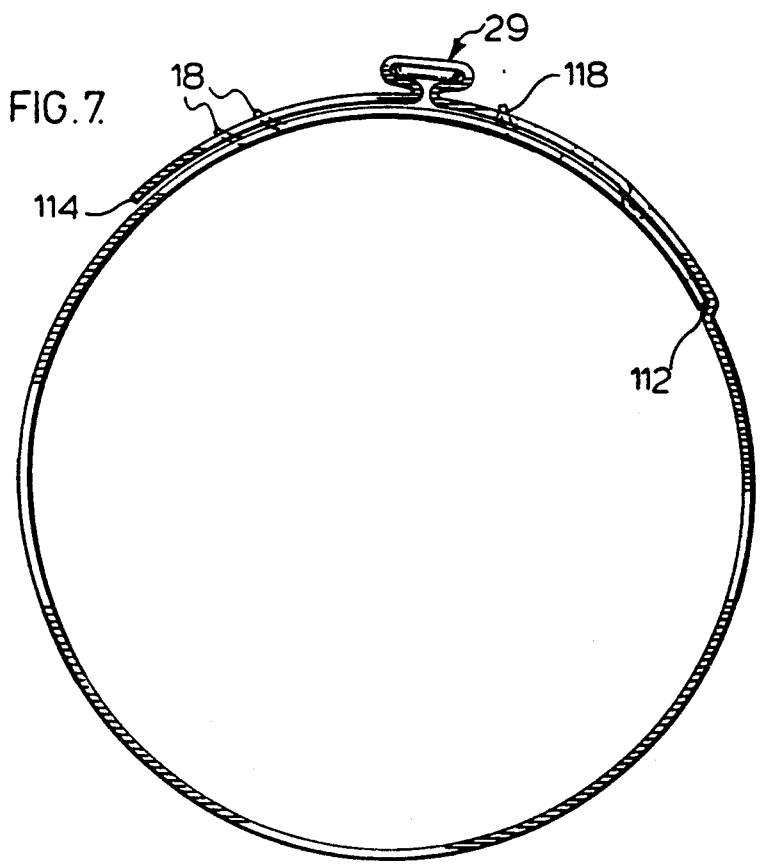

HOSE CLAMP

FIELD OF INVENTION

This invention relates to a hose clamp, more particularly to an open hose clamp having free ends adapted to be mechanically interconnected and having an ear to be deformed for reducing the circumference of the clamp to produce a clamping force.

BACKGROUND OF INVENTION

Various types of hose clamps are known in the prior art in which a clamping band made of flat strip material was adapted to be mechanically interconnected at the free ends thereof to form a ring-like clamping structure that can be tightened by contraction of so-called "Oetiker" ear as described in U.S. Pat. No. 3,789,463.

In particular, U.S. Pat. No. 4,299,012 discloses a clamping band having open ends adapted to be mechanically interconnected by outwardly extending hooks in an inner band portion operable to engage in corresponding apertures provided in an outer band portion. The band is provided with a plastically deformable ear which is provided for tightening the clamping band about an object to be fastened by plastic deformation of the ear. This clamp provides a substantially gap-free transition in the circumferential direction from the inner band portion to the ring like configuration of the clamp structured defined by the clamping band by the use of a tongue like extension at the free end of the inner band portion which is operable to engage into a tongue receiving aperture or channel provided in the outer band portion.

In order to provide the hooks of this type of clamp with sufficient strength to resist the tensional forces upon contracting the ear, the clamp is provided with at least one support hook which is realised by cold-deforming the band material to present a force engaging abutment surface to absorb the circumferentially directed forces. Although the cold deformed support hooks resist the circumferentially directed forces adequately, such support hooks do not adequately engage the aperture in the outer band member to maintain engagement therewith during crimping of the ear. As a result, the outer band member may dislodge from the inner band member during contraction of the ear resulting in the misclamping of the clamp about the objects to be clamped. This results in waste as the clamps cannot be reused after the ear has been deformed.

A person installing a clamp could deform the ear in a manner known in the art until the outer band member on opposite sides of the ear contact each other for maximum clamping force. Other than maximum clamping where the ear is fully deformed, there is no way to determine accurately the degree of clamping force which has been applied to the hose. There is no reliable method for determining whether the clamp has been crimped to a sufficient degree. Quality control of the installation of such clamps is difficult, time consuming and requires a special skill to evaluate the crimp of the clamp.

OBJECTS OF THE INVENTION

It is an object of the invention to provide a clamp structure of the open type, which can be installed circumferentially about an object to be fastened and in which the open ends can be thereafter interconnected mechanically by the use of hooks and tabs which will deform upon crimping of the ear to positively engage the ends of the clamp structure.

It is a further object of this invention to provide a clamping structure having a non load-bearing hook which extends from the lapped band to the lapping band through an aperture therein when the clamp has been crimped to a sufficient degree thereby limiting the degree of crimping.

It is still a further object of this invention to provide the lapped end with an aperture extending circumferentially thereof for receiving a circumferentially extending projection extending towards the lapped end for maintaining the lapped end seated under the lapping end upon crimping of the ear.

These and other objects may be accomplished by providing a clamping structure comprising a clamping band having open ends for lapping one end over the other end in a lapping direction and presenting a lapped portion and a lapping portion. The open ends of the band are mechanically interconnected by several outwardly extending hooks in the lapped portion. The hooks are operable to engage in corresponding apertures in the lapping portion. The clamp structure has an ear for tightening the clamping band about an object to be fastened, characterized in that at least one hook extends out of the plane in the lapping direction presenting a hook aperture and at least one corresponding aperture has a tab extending from an edge of the aperture in a direction opposite the lapping direction for abutting the hook, whereupon deformation of the ear the tab deforms towards the lapped portion forming an abutment surface for absorbing the circumferentially directed clamping forces and projects into the hook aperture for interlocking the lapped portion with the lapping portion.

These and further objects, features and advantages of the present invention will become more obvious from the following description when taken in connection with the accompanying drawings which shows, for purposes of illustration only, two embodiments in accordance with the present invention, wherein:

FIG. 1 is a perspective view of the preferred embodiment of clamp of the present invention;

FIG. 2 is a side elevational view of the embodiment of FIG. 1;

FIG. 3 is a partial perspective exploded view illustrating the mechanical interconnection of the embodiment of FIG. 1;

FIG. 3a is a partial perspective view illustrating an alternate embodiment of the apertures;

FIG. 4 is a partial sectional view along the lines A—A of FIG. 2, illustrating the mechanical interconnection during the crimping process;

FIG. 5 is a perspective view of a second embodiment of clamp of the present invention;

FIG. 6 is a side elevational view of the embodiment of FIG. 5; and

FIG. 7 is a side elevational view of the embodiment of FIG. 5 after the ear has been crimped.

DETAILED DESCRIPTION OF THE PREFERRED EMBODIMENT

The clamp of the present invention is generally illustrated as 10 on FIG. 1. Clamp 10 generally comprises a thin band of sheet metal, preferably stainless steel.

Clamp 10 comprises a lapped end 12 and a lapping end 14. The direction moving from the lapped end 12 to the lapping end 14 defines a lapping direction as illustrated by the arrow on FIG. 1.

Lapped end 12 is provided with an aperture 16 which extends circumferentially of the clamp 10. Next along the circumferential extent of the clamp 10 are hooks 18. Hooks 18 are lanced by cutting a substantially U-shaped cut through the clamp 10. The hooks are bent outwardly from the surface of the clamp 10 in a lapping direction to present hook apertures 19.

Next along the clamp 10 there is provided a step 20 defining the limit between the lapped end 1 and the lapping end 14.

Next along the clamp 10 is a dimple 22 formed by lansing two circumferentially extending slots and punching the metal between the two slots inwardly to form dimple 22. The distance between adjacent slots to form dimple 22 is less than the distance between the longitudinal edges of slot 16. Dimple 22 will extend into aperture 16, but is adapted not to extend beyond the thickness of the band.

Next along the clamp 10 there is an ear 24 which includes generally outwardly extending leg portions 3 and 32 and interconnected by a bridging portion 36. Bridging portion 36 has an inwardly formed emboss 38.

Next along clamp 10 there is provided a plurality of like apertures 26, in substantially circumferential alignment. Preferably, apertures 26 have a substantially square outline having a tab 28 extending from one edge thereof. Tabs 28 extend in a direction opposite the lapping direction. Hooks 18 are adapted to extend through aperture 26 and will abut tab 28 as illustrated in FIGS. 2 and 4. Alternatively, apertures 26 and tab 28 could have a U-shaped or circular outline as illustrated in FIG. 3a.

In operation, the clamp is placed about an object to be clamped. For instance, the clamps of the present invention are commonly used to retain a flexible boot about a constant velocity joint which is commonly used for front wheel drive automobiles.

The clamp 10 is placed about the object and the lapping end 14 is overlapped over the lapped end 12. In this position, hooks 18 will extend through two of apertures 26 and dimple formation 22 will extend into aperture 16. Ear 24 is contracted by applying a force at the base of legs 30 and 32 until the opposite leg members contact each other.

As ear 24 is deformed, dimple 22 will slide relative within aperture 16. The dimple 22 will retain the lapped 12 beneath the lapping end 14.

As the ear 24 is contracted, the circumference of the clamp 10 is diminished causing tab 28 to abut firmly with hook 18. Upon further contraction of ear 24, tab 28 will deform inwardly as hook 18 deforms outwardly increasing the engagement between the lapped end and the lapping end. Upon completion of the crimping process, tab 28 will be fully registered within hook aperture 19 and hook 18 will overlap tab 28 to securely connect the open ends of clamp 10 together providing clamping forces to retaining the object about the object.

In a second embodiment as illustrated in FIGS. 5, 6 and 7, the clamp 110 is identical to the clamp 10 except that clamp 110 has a single pair of hooks 18 and corresponding apertures 26. Between ear 24 and dimple 22 there is provided an aperture 126 which has the same outline as aperture 26. On the lapped end 112 between the hooks 18 and aperture 16, hook 118 extends towards the lapping end 114, in a lapping direction. The base of hook 118 and aperture 126 will be separated in a lapping direction by the final circumferential distance required for final clamping.

In operation, the clamp 118 operates in the same fashion as the first embodiment. As clamp 118 is being crimped, hook 118 will abut with surface 150 of the lapping end 114. Upon further crimping, the hook 118 will be deflected under the lapping end 114. Upon further crimping, hook 118 will travel past surface 150 until hook 118 springs through aperture 126. When hook 118 springs through aperture 126 the clamp has been crimped sufficiently within predetermined limits.

Even after plastic deformation of the ear, there will still be a certain amount of elastic deformation. Therefore upon release of the crimping device from the ear, the clamp 110 will expand elastically due to the resiliency of the article being clamped. As the clamp 110 expands, hook 118 will abut with tab 128 of aperture 126 and tab 128 will deform inwardly as hook 118 deforms outwardly increasing the engagement between the lapped end and the lapping end.

As is apparent, the engagement of the lapped and lapping end by hook 118 and aperture 126 provides the clamp with an additional means of securement. If the ear is severed, the hook 118 and aperture 126 will maintain the clamp about the object being clamped and maintaining a clamping force. For a boot being clamped to about a CV rod on an automobile, this increases the likelihood that a failed clamp will be detected upon routine inspection and maintenance of the automobile.

It is also apparent to a worker skilled in the art that with a plurality of like hooks 118 or a plurality of like apertures 126 together with a plurality of apertures 26 the clamp could be adapted to have a plurality of fixed circumferential distances. Each aperture 126 could be coded or marked to indicate the final circumferential distance.

Although the disclosure describes and illustrates preferred embodiments of the invention, it is to be understood that the invention is not limited to the particular embodiments. Many variations and modifications will now occur to those skilled in the art.

I claim:

1. A hose clamp comprising:

a clamping band means having open ends for lapping one end over the other end in a lapping direction and presenting a lapped portion and a lapping portion, means mechanically interconnecting the open ends of the band means including several outwardly extending first hook means in the lapped portion and corresponding first aperture means in the lapping portion, said first hook means operable to engage in corresponding first aperture means in the lapping portion, and ear means in the clamp structure for tightening the clamping band means about an object to be fastened, characterized in that at least one first hook means extends out of the plane in the lapping direction presenting a hook aperture and at least one corresponding first aperture means is adapted to receive said first hook means for positioning the lapping end over the lapped end, said first aperture means having a substantially co-planar tab extending from an edge of said aperture means in a direction opposite the lapping direction for abutting said hook means, whereby upon deformation of the ear means the tab deforms towards the lapped portion forming an abutment surface for absorbing the circumferentially directed clamping forces and projects into said hook aperture for interlocking the lapped portion with the lapping portion.

2. A clamp as claimed in claim 1 wherein said lapped portion includes a second hook means biased to engage into a corresponding second aperture means in the lapping portion before the ear means, whereby said second hook means extends through said corresponding second aperture means upon predetermined deformation of the ear means.

3. A clamp as claimed in claim 1 or 2 wherein said lapped end includes a guide aperture extending in the lapped direction and said lapping portion includes a dimple for extending into said guide aperture whereby said dimple retains said lapped portion under said lapping portion upon deformation of the ear.

4. A clamp as claimed in claim 3 wherein said first hook means is at least two substantially rectangular hooks bent out of the band means, which hooks are defined by substantially U-shaped cuts therein.

5. A clamp as claimed in claim 4 wherein said ear means is a deformable ear on the lapping portion for tightening the clamp about the object to be fastened.

6. A clamp as claimed in claim 5 wherein said first aperture means includes a plurality of like apertures, substantially rectangular in shape and spaced for receiving said first hook means at a plurality of circumferential distances.

7. A clamp as claimed in claim 6 wherein the circumferential length of said aperture tab is less than that of said like apertures and less than the length of said hooks.

8. A clamp as claimed in claim 2 wherein said second hook means includes a biased hook extending out of the plane in the lapping direction presenting a second hook aperture and said corresponding second aperture means is a plurality of like rectangular apertures, said biased hook is adapted to extend through and abut with the corresponding aperture spaced at a predetermined circumferential distance.

9. A clamp as claimed in claim 8 wherein said rectangular apertures are coded to indicate each of the predetermined circumferential distances.

10. A clamp as claimed in claim 2 wherein said hook means extends out of the plane in the lapping direction presenting a second hook aperture and said corresponding second aperture means has a second substantially co-planar tab extending from an edge thereof in a direction opposite the lapping direction for abutting said second hook means, said second tab deformable to project into said second hook aperture upon elastic relaxation of said band means after said predetermined deformation interlocking said lapping end to the lapped end.

11. A clamp as claimed in claim 10 wherein said second aperture means includes a plurality of like apertures spaced at predetermined circumferential distances.

* * * * *